May 3, 1938. J. V. LYNN 2,115,930
POWDER OR ROUGE BLENDING AND HOLDING CONTAINER
Filed March 28, 1936

INVENTOR.
J. V. LYNN
BY
M. Falbert Dick
ATTORNEY.

Patented May 3, 1938

2,115,930

UNITED STATES PATENT OFFICE 2,115,930

POWDER OR ROUGE BLENDING AND HOLDING CONTAINER

Jesse V. Lynn, Des Moines, Iowa

Application March 28, 1936, Serial No. 71,433

2 Claims. (Cl. 132—79)

The principal object of my invention is to provide a small portable container for powder and rouge users that not only permits the carrying of various colors and shades of powder or rouge, but accommodates and facilitates the mixing and/or blending of the same by the user before being applied on the face.

A further object of this invention is to provide a powder or rouge blending container that permits the easy manual placement of the various shades of powder or rouge to be mixed into the blending dish of the device from the respective bins holding the powders and rouges.

A still further object of my invention is to provide a powder and/or rouge blending and holding container that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1:
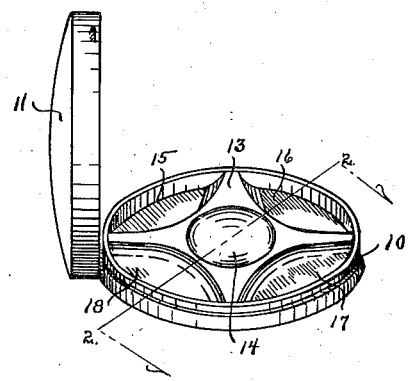
Fig. 1 is a perspective view of my device ready for use with its lid in open position.
Figure 2:
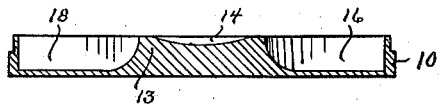
Fig. 2 is an enlarged cross sectional view of the main portion of my holding and blending container taken on line 2—2 of Fig. 1.

Fastidious women not only demand various shades of powder and rouge for different hours of the day, but require various shades and blends to harmonize with the dress or color ensemble they may happen to be wearing at the moment. Obviously such women can not be carrying around a multitude of compacts or packages of various pre-blended shades of powder and rouge, nor can they always obtain from even such great number of packages a shade particularly suitable for their needs. I have overcome such objections as will hereinafter be appreciated.

Referring to the drawing, I have used the numeral 10 to designate the outside lower shell housing of my device. This portion 10 has hinged to it an upper shell lid 11. These members 10 and 11 form a portable container similar to that usually used to hold a single color of powder or rouge and commonly known as "compacts".

The lid 11 has on its inner side a mirror 12.

Inside the portion 10 is a member which I have designated by the numeral 13 having a central depression 14. This depression 14 is circular and free from corners or sharp edges. It is comparatively shallow and may be considered as the mixing and blending bowl of the device. Surrounding the mixing bowl depression 14 are a plurality of comparatively deep bins or compartments 15, 16, 17, and 18, respectively. These bins 15, 16, 17, and 18 are designed to hold the powders or rouges to be mixed. As an example, bin 15 may hold white powder, bin 16 a pink powder, bin 17 a tan powder and bin 18 a lavender powder.

Figure 3:
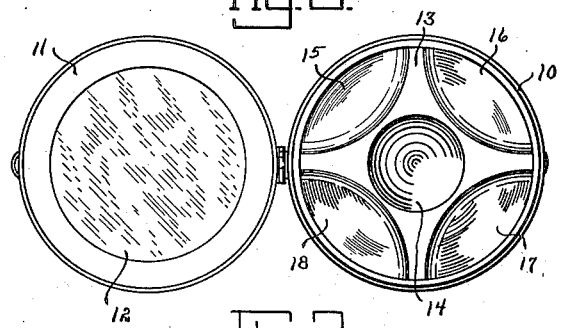
Fig. 3 is a top plan view of my device in open condition.

One of the features of the device is that the wall of each of the compartment bins 15, 16, 17, and 18 adjacent the mixing bowl portion 14 is sloping upwardly and inwardly toward the mixing bowl 14 as shown in the drawing. This is highly desirable as it facilitates the manual movement of the powder or rouge from the various bins into the mixing bowl. These walls of the compartment bins are also circular as viewed from the top and each wall has its central portion closely approaching the mixing bowl as shown in Fig. 3. By this construction these walls adjacent the mixing bowl aid in guiding and proportioning the amount of powder or rouge slid into the mixing bowl from the bins by the finger of the user. Obviously after the user has placed the proper colors of powder and rouge into the mixing bowl they are thoroughly blended and mixed together in the mixing bowl by agitating the same with the finger. After the powders and rouges have been properly mixed and blended they are then ready to be placed on the face. If desired a small pad may be used for moving the powders and/or rouges from the bins into the mixing bowl instead of the finger. Also such a small pad may be used for the mixing and blending of the powders or rouges in the mixing bowl.

In constructing the device it is highly desirable that the lid fit tightly down on the member 13 when the device is not in use in order that there may be no danger of any powder or rouge in one bin getting over into another bin of powder or rouge.

From the above it will be readily seen that I have provided a highly desirable portable powder or rouge holding and mixing case.

Some changes may be made in the construction and arrangement of my improved powder or rouge blending and holding container without departing from the real spirit and purpose of my invention, and it is my intention to cover by my claims any modified forms of structure or use of mechanical equivalents which may be reasonably included within their scope.

I claim:

1. In a material blending and holding container, a circular tray portion, a dividing element in said tray portion having curved walls dividing said tray portion into a plurality of bins, and a shallow depression in the top center portion of said dividing element having a depth much less than the depth of said plurality of bins; said circular walls of said dividing element having their central portions approaching closely said depression and sloping upwardly and inwardly toward said depression.

2. In a material blending and holding container, a tray portion, a dividing element in said tray portion forming a plurality of bins inside said tray portion, and a centrally located circular depression in the upper surface of said dividing element for forming a mixing bowl; said depression being of a depth much less than the depth of said bins and located in close proximity to all of said bins.

JESSE V. LYNN.